United States Patent
Schweiger

(10) Patent No.: US 8,500,131 B2
(45) Date of Patent: Aug. 6, 2013

(54) EXHAUST MANIFOLD GASKET

(75) Inventor: David J Schweiger, Pewaukee, WI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 127 days.

(21) Appl. No.: 13/301,842

(22) Filed: Nov. 22, 2011

(65) Prior Publication Data

US 2012/0139187 A1    Jun. 7, 2012

Related U.S. Application Data

(60) Provisional application No. 61/458,852, filed on Dec. 2, 2010.

(51) Int. Cl.
*F02F 11/00* (2006.01)

(52) U.S. Cl.
USPC .......... 277/594; 277/590; 277/591; 277/593; 277/595; 277/598

(58) Field of Classification Search
USPC .............. 277/590, 591, 593, 594, 595, 598
See application file for complete search history.

(56) References Cited

U.S. PATENT DOCUMENTS

| | | | | |
|---|---|---|---|---|
| 3,352,564 A * | 11/1967 | Johnson | | 277/593 |
| 3,573,873 A * | 4/1971 | Pearson | | 277/610 |
| 5,215,315 A * | 6/1993 | Belter | | 277/597 |
| 5,360,219 A * | 11/1994 | Okuda et al. | | 277/592 |
| 5,791,660 A * | 8/1998 | Belter | | 277/598 |
| 5,803,465 A * | 9/1998 | Schweiger | | 277/593 |
| 5,975,539 A * | 11/1999 | Ueda et al. | | 277/593 |
| 5,979,035 A * | 11/1999 | Tahara et al. | | 29/432.2 |
| 5,979,906 A * | 11/1999 | Silvian | | 277/593 |
| 6,076,833 A * | 6/2000 | Geshi | | 277/595 |
| 6,139,025 A * | 10/2000 | Miyaoh | | 277/593 |
| 6,193,237 B1 * | 2/2001 | Schweiger et al. | | 277/598 |
| 6,231,050 B1 * | 5/2001 | Raden | | 277/598 |
| 6,409,178 B1 * | 6/2002 | Raden et al. | | 277/592 |
| 6,517,084 B2 * | 2/2003 | Inamura | | 277/592 |
| 6,578,851 B1 * | 6/2003 | Bryant, III | | 277/598 |
| 6,641,142 B2 * | 11/2003 | Hegmann et al. | | 277/594 |
| 6,746,020 B2 * | 6/2004 | Sumi et al. | | 277/590 |
| 6,851,677 B2 * | 2/2005 | Miyaoh et al. | | 277/594 |
| 6,962,346 B2 * | 11/2005 | Kerchner et al. | | 277/597 |
| 7,234,433 B2 * | 6/2007 | Liebert | | 123/193.5 |
| 7,306,236 B2 * | 12/2007 | Imai | | 277/598 |
| 8,246,053 B2 * | 8/2012 | Shaver et al. | | 277/590 |
| 8,336,888 B2 * | 12/2012 | Fatora et al. | | 277/592 |
| 2001/0048201 A1 * | 12/2001 | Hegmann | | 277/591 |
| 2006/0197289 A1 * | 9/2006 | Lai et al. | | 277/594 |
| 2007/0290452 A1 * | 12/2007 | Matsushita et al. | | 277/595 |
| 2009/0285624 A1 * | 11/2009 | Waddell et al. | | 403/14 |
| 2011/0204580 A1 * | 8/2011 | Tripathy | | 277/593 |

* cited by examiner

*Primary Examiner* — Vishal Patel
*Assistant Examiner* — Eugene G Byrd
(74) *Attorney, Agent, or Firm* — Marshall & Melbhorn LLC

(57) ABSTRACT

An exhaust manifold gasket having at least two layers and a series of tabs and recesses. The gasket has a first outer layer and a second outer layer each with an outer surface, an inner surface, two bolt hole flanges, and a central aperture. The surfaces are bounded by an outer perimeter portion, with locator tabs and recesses. A first inner layer having an outer surface, an inner surface, two bolt hole flanges, and a central aperture. The surfaces are bounded by an outer perimeter portion with two sets of foldable tabs. The first inner layer also has a bead circumferentially around the central aperture. A second inner layer may be provided having an outer surface, an inner surface, two bolt hole flanges, and a central aperture. The surfaces are bounded by an outer perimeter portion with foldable tabs and recesses, and a bead circumferentially around the central aperture.

19 Claims, 4 Drawing Sheets

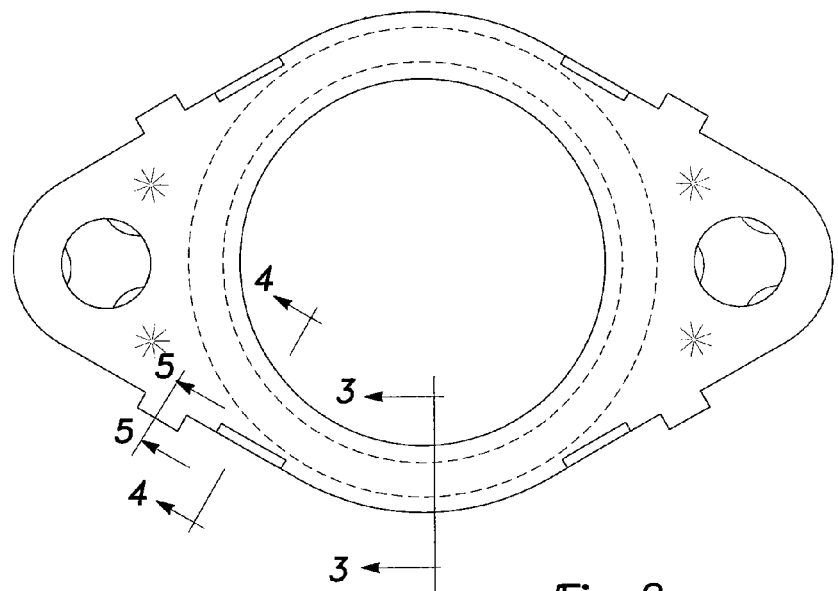
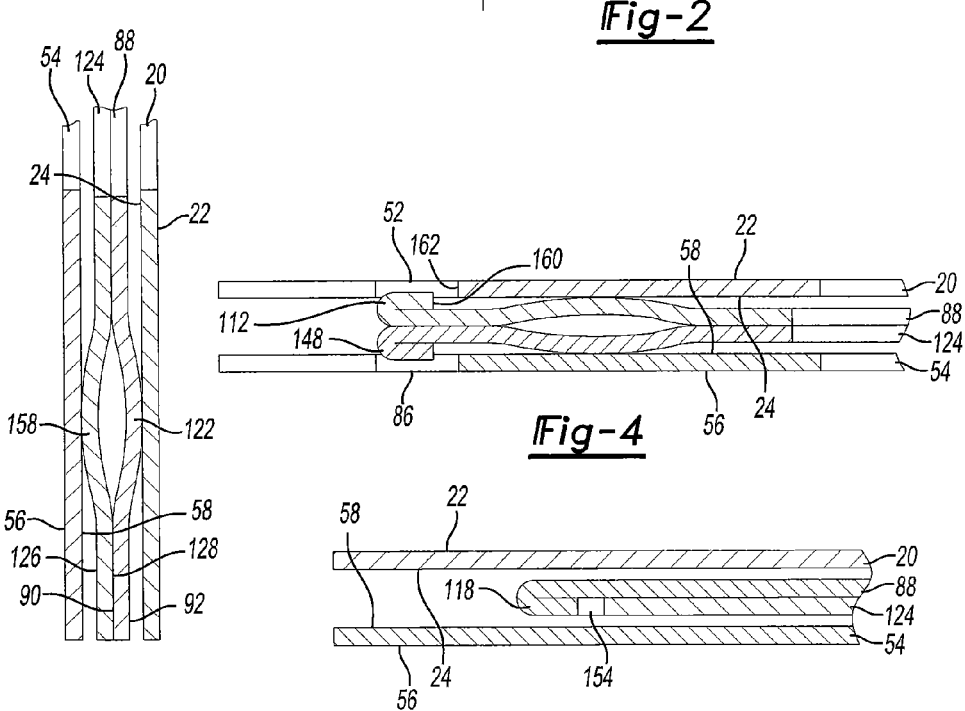
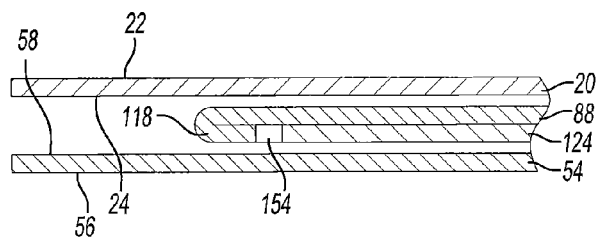

EXHAUST MANIFOLD GASKET

CROSS-REFERENCE TO RELATED APPLICATION

This application is a non-provisional application filed off of U.S. patent application Ser. No. 61/458,852 filed on Dec. 2, 2010, which is incorporated by reference in its entirety herein. This non-provisional application is being filed during the pendency of U.S. patent application Ser. No. 61/458,852.

FIELD OF THE INVENTION

The present invention relates to an exhaust manifold gasket for use in internal combustion engines.

BACKGROUND OF THE INVENTION

Gaskets essentially are used to seal and prevent leakage between two parts. Exhaust manifold gaskets for internal combustion engines seal any gaps and prevent leakage when the mating surfaces of the cylinder head and the exhaust manifold are bolted together. The gaskets may be made of layers and one or more of the layers may include a bead. Sealing the joined area between the parts can be difficult because the cylinder head, manifold and gasket all move due to pressure and temperature fluctuations. There are also problems due to thermal expansion and thermal contraction, which occurs when the temperature varies in the cylinder head and the manifold.

Thermal motion, resulting from hot exhaust gases, increasing combustion pressure, steep thermal swings, and sheer stresses are created in the joined area between the cylinder head and the exhaust manifold increasing the risk of horizontal motion and shifting of the gasket layers, such as in a multi-layer steel (MLS) gasket. When this occurs, the layers shift and the mechanical beads in the gasket layers can become misaligned. This reduces the sharing capabilities of the beads located on the various layers, and the misaligned beads may induce unusual stress concentrations.

There are also multiple openings in the cylinder head and the manifold for exhaust gases and bolts holes. The areas around these openings are known to be put under additional stresses and leakage is common due to movement and misalignment of the gasket layers.

Traditionally, the various gasket layers are aligned and held in place during gasket assembly by welding, eyeleting or form-locking. The eyeleting and form-locking methods both add thickness to the gasket and therefore must be located outside of the joined area, which is not ideal. While welding does not necessarily add thickness to the gasket, the weld spots may crack and/or break due to horizontal hardware motion which allows the gasket layers to shift.

In view of the foregoing disadvantages of the prior art, it would be advantageous for a MLS gasket to be able to prevent or resist horizontal motion and misalignment of the layers to the extent that it negatively affects performance of the gasket.

SUMMARY OF THE INVENTION

The present invention is directed toward an exhaust manifold gasket assembly having at least two or more layers, and utilizing a series of tabs and recesses to maintain alignment of the layers. The exhaust manifold gasket assembly has a first outer layer and a second outer layer each comprising an outer surface, an inner surface, two bolt hole flanges with bolt holes therethrough, and a central aperture between the flanges. The surfaces are bounded by an outer perimeter portion, wherein at least two locator tabs and two recesses are located. A first inner layer may be provided and comprises an outer surface, an inner surface, two bolt hole flanges with bolt holes therethrough, and a central aperture between the flanges. The surfaces are bounded by an outer perimeter portion. A first set of foldable tabs extend from the outer perimeter portion and have a fold onto the outer surface, and a second set of foldable tabs extend from the outer perimeter portion and have a fold onto the inner surface. The first inner layer also has a bead circumferentially extending about the central aperture inboard the outer perimeter portion. A second inner layer may be provided and comprises an outer surface, an inner surface, two bolt hole flanges with bolt holes therethrough, and a central aperture between the flanges. The surfaces are bounded by an outer perimeter portion, wherein at least two foldable tabs and two recesses are located, and a bead circumferentially extends about the central aperture inboard the outer perimeter portion.

In accordance with the present invention, it has been discovered that once the layers are assembled together, horizontal movement between the layers is significantly decreased, and the beads located on the inner layers remain aligned reducing unusual stress concentrations.

BRIEF DESCRIPTION OF THE DRAWINGS

The above, as well as other advantages of the present invention, will become readily apparent to those skilled in the art from the following detailed description when considered in the light of the accompanying drawings in which:

FIG. 2 is a top view of the assembled exhaust manifold gasket in FIG. 1;

FIG. 3 is a cross-sectional view of a portion of the embodiment of FIG. 2 along line 3-3;

FIG. 4 is a cross-sectional view of a portion of the embodiment of FIG. 2 along line 4-4;

FIG. 5 is a cross-sectional view of a portion of the embodiment of FIG. 2 along line 5-5;

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
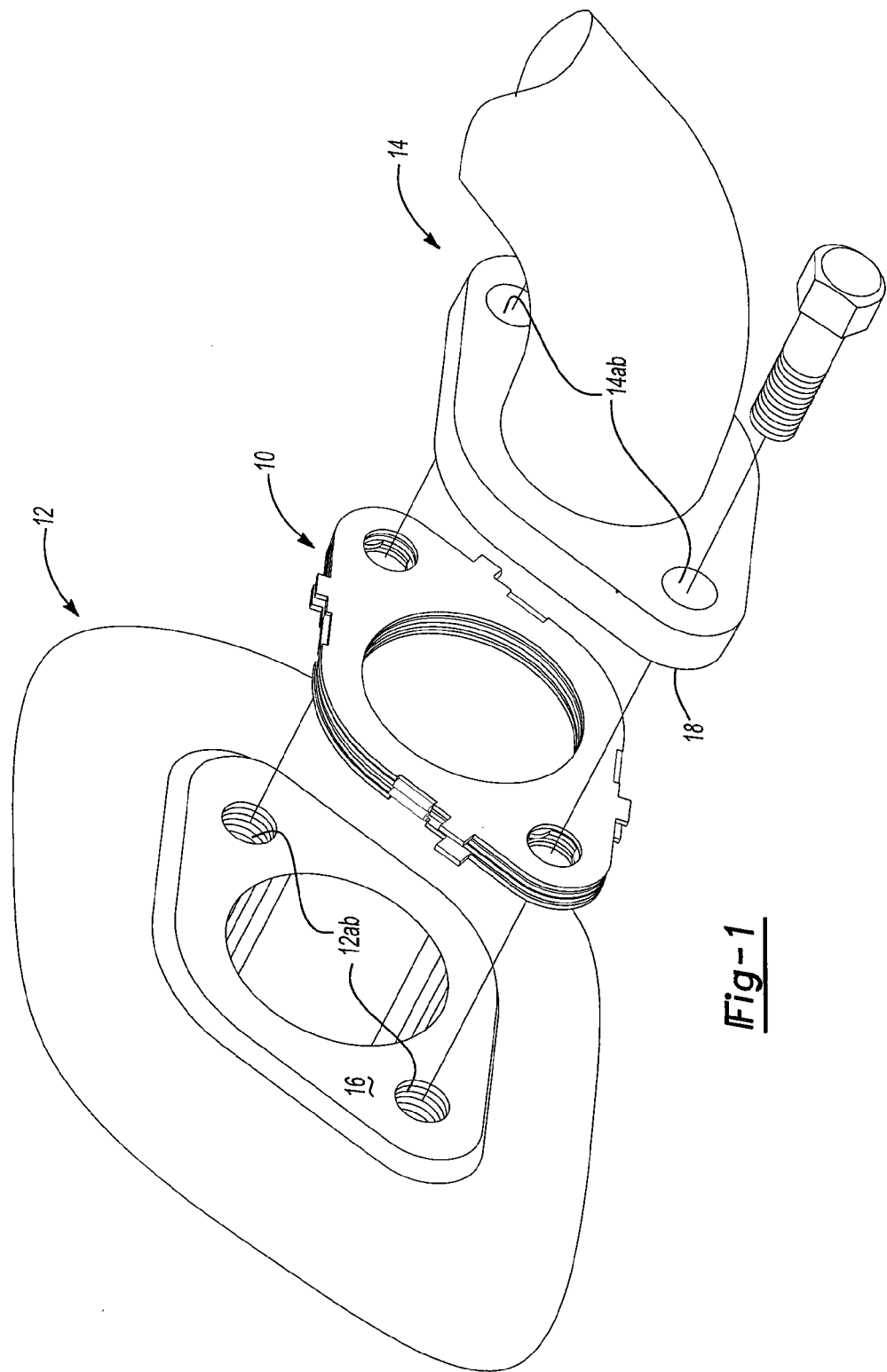
FIG. 1 is a partial perspective exploded view of the present invention with an exhaust manifold gasket, an exhaust manifold and cylinder head.

As shown in FIG. 1, an exhaust manifold gasket assembly 10 is positioned between a cylinder head 12 and an exhaust manifold 14, so as to create an air tight seal between the two parts when they are bolted together. Both the cylinder head 12 and the exhaust manifold 14 are parts of an internal combustion engine (not shown.) The cylinder head 12 sits on top of the cylinder block (not shown.) It closes in the top of the cylinder, to form a combustion chamber. The exhaust manifold 14 collects exhaust gases from the cylinder combustion chamber, and delivers the gases to an exhaust pipe. Both the cylinder head 12 and the exhaust manifold 14 have bolt apertures 12a, 12b, 14a, 14b which align with each other, and each has a flat surface 16, 18 for receiving an exhaust manifold gasket assembly between them, as shown in the figure. Exhaust manifold gasket assemblies are manufactured in accordance with the various shapes of cylinder heads and exhaust manifolds, and include numerous openings, such as exhaust gasket openings and bolt holes. FIG. 1 depicts one embodiment of an exhaust gasket assembly 10; however, other shapes, sizes and designs are permissible. Various sealing means are provided in the gasket assembly for sealing around the respective openings.

The embodiment of the exhaust manifold gasket assembly 10, as depicted in FIGS. 2-10, comprises a first outer layer 20, and second outer layer 54, a first inner layer 88 and a second inner layer 124. It is also within the scope of the invention for there to be more or fewer layers. The two outer layers 20, 54 and the two inner layers 88, 124 may each be made of a metallic material, such as steel.

Figure 6:
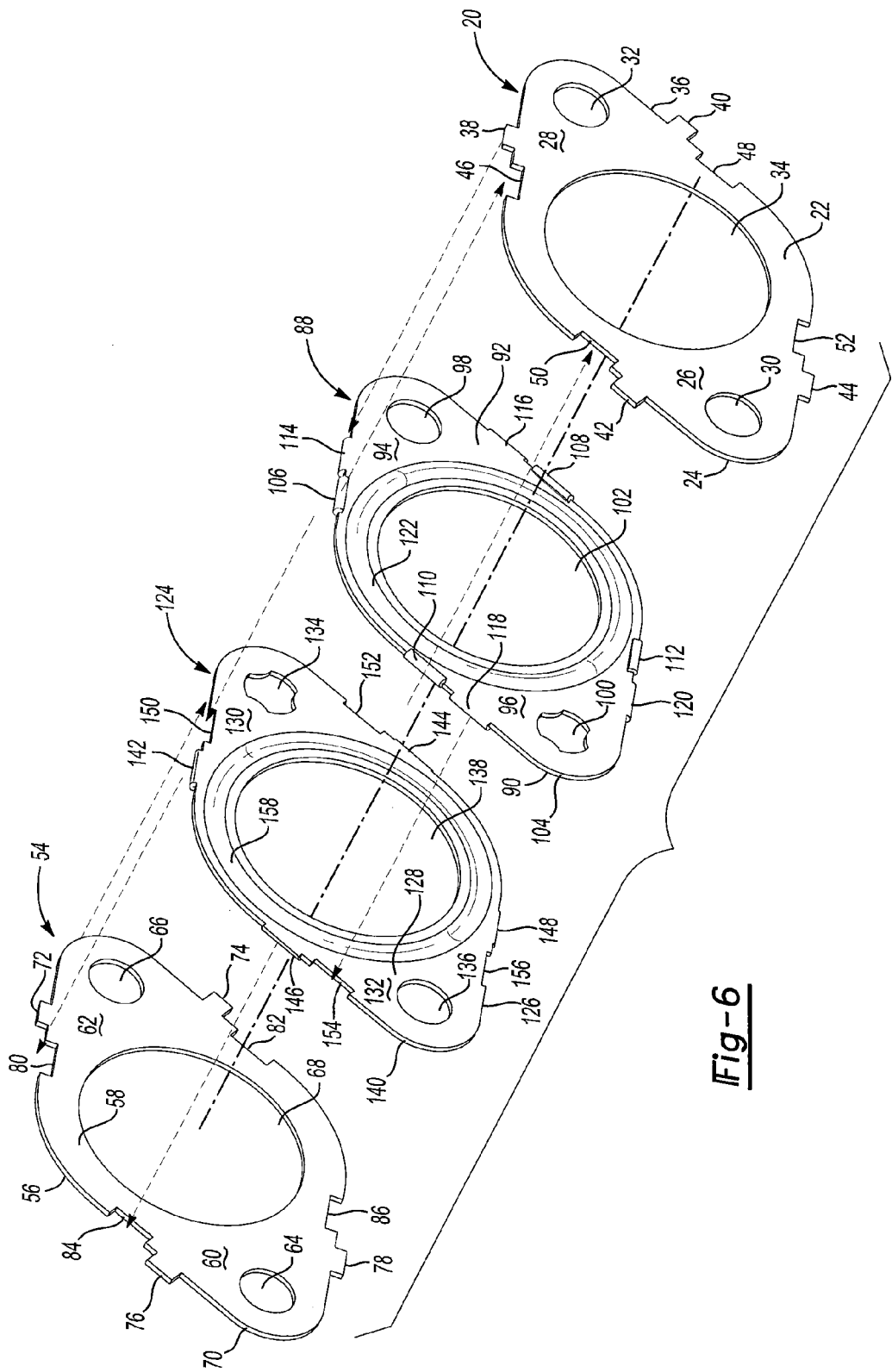
FIG. 6 is a perspective assembled view of the layers of the embodiment of FIG. 2.
Figure 7:
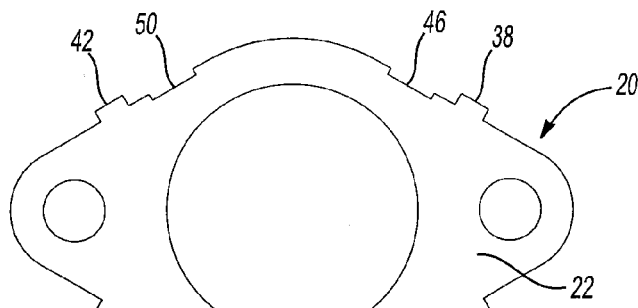
FIG. 7 is a top view of a layer of the embodiment of FIG. 2.
Figure 10:
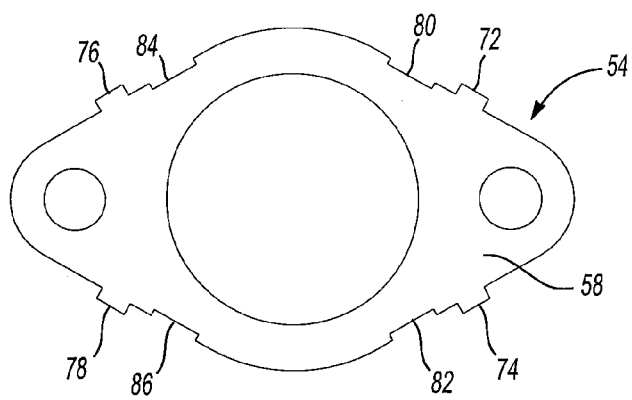
FIG. 10 is a top view of yet another layer of the embodiment of FIG. 2.

As shown in FIGS. 6, 7 and 10, the first outer layer 20 and the second outer layer 54 each comprise an outer surface 22, 56, an inner surface 24, 58, two bolt hole flanges 26, 28, 60, 62 with bolt holes 30, 32, 64, 66 therethrough, and a central aperture 34, 68 between the flanges 26, 28, 60, 62.

The surfaces of the outer layers 22, 56, 24, 58 are bounded by an outer perimeter portion 36, 70. The outer perimeter portion 36, 70 is generally oval in shape and includes locator tabs 38, 40, 42, 44, 72, 74, 76, 78 and recess 46, 48, 50, 52, 80, 82, 84, 86. As shown in FIGS. 7 and 10, the locator tabs 38, 40, 42, 44, 72, 74, 76, 78 extend unitarily outward from the outer perimeter portion 36, 70, and the recesses 46, 48, 50, 52, 80, 82, 84, 86 extend inward from the outer perimeter portion 36, 70. While as depicted in the figures four locator tabs 38, 40, 42, 44, 72, 74, 76, 78 and four recesses 46, 48, 50, 52, 80, 82, 84, 86 are shown, it is also within the scope of the invention for there to be more or fewer locator tabs and recesses.

The locator tabs 38, 40, 42, 44, 72, 74, 76, 78 and recesses 46, 48, 50, 52, 80, 82, 84, 86 are adjacent one another and generally located toward the narrow ends of the oval outer perimeter portion 36, 70 between the bolt hole flanges 26, 28, 60, 62 and central aperture 34, 68. The locator tabs 38, 40, 42, 44, 72, 74, 76, 78 are narrower in width than the recesses 46, 48, 50, 52, 80, 82, 84, 86. The locator tabs 38, 40, 42, 44, 72, 74, 76, 78 and recesses 46, 48, 50, 52, 80, 82, 84, 86 on each of the outer layers 20, 54 are aligned with one another, as depicted on FIGS. 2 and 6. The two outer layers 20, 54 are symmetrical and identical to one another.

As shown in FIGS. 3 and 4, the inner surfaces 24, 58 and the outer surfaces 22, 56 of each of the outer layers 20, 54 are planar and parallel to one another, and define between them a substantially constant thickness.

Figure 8:
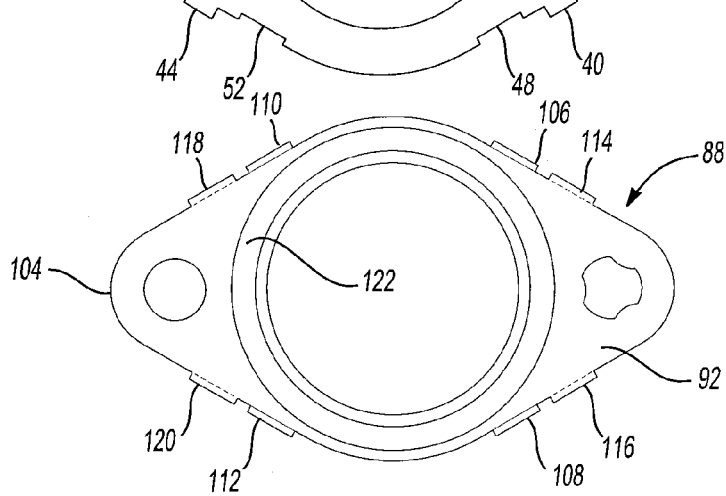
FIG. 8 is a top view of another layer of the embodiment of FIG. 2.

As depicted in FIGS. 6 and 8, the first inner layer 88 comprises an outer surface 90, an inner surface 92, two bolt hole flanges 94, 96 with bolt holes 98, 100 therethrough, and a central aperture 102 between the flanges 94, 96. The surfaces are planar and bounded by an outer perimeter portion 104, wherein a first set of unitary foldable tabs 106, 108, 110, 112 and a second set of unitary foldable tabs 114, 116, 118, 120 are formed around the outer perimeter portion 104. As depicted in the figures, each set of foldable tabs 106, 108, 110, 112, 114, 116, 118, 120 contain four tabs, however, it is within the scope of the invention for there to be more or fewer tabs. The foldable tabs 106, 108, 110, 112, 114, 116, 118, 120 bend approximately 180 degrees, forming a C-shape. The first set of foldable tabs 106, 108, 110, 112 is formed from the outer perimeter portion 104 and each foldable tab 106, 108, 110, 112 has a fold onto the inner surface 92 of the first inner layer 88. This set of foldable tabs 106, 108, 110, 112 aligns with and engages the recesses 46, 48, 50, 52 of the first outer layer 20. More particularly as shown in FIG. 4, an end surface 160 of a foldable tab 112 selectively contacts a wall 162 defining the recess 52 to prevent the layer with the tab or recess from moving with respect to the adjacent layer. This feature is exemplary for any place this feature is present in the invention. This interaction acts as a stopper feature to ensure little or no lateral movement between the layers.

The second set of foldable tabs 114, 116, 118, 120 is formed from the outer perimeter portion 104 and each foldable tab 114, 116, 118, 120 has a fold onto the outer surface 90 of the first inner layer 88, as detailed in FIG. 4. The first inner layer 88 also comprises a full bead 122 which circumferentially extends about the central aperture 102 and is inboard of the outer perimeter portion 104, as depicted in FIGS. 2 and 8.

Figure 9:
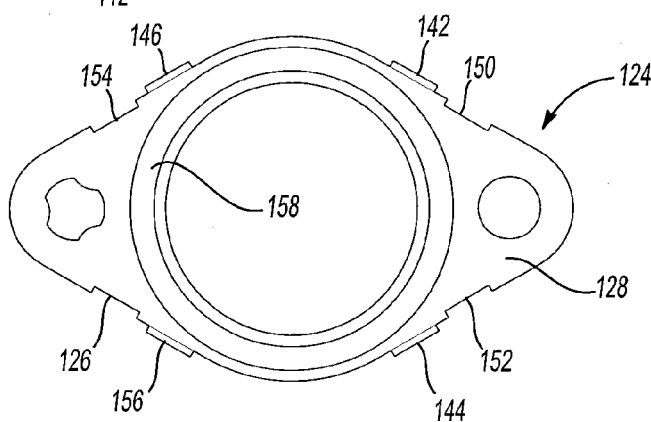
FIG. 9 is a top view of yet another layer of the embodiment of FIG. 2.

As depicted in FIGS. 6 and 9, the second inner layer 124 comprises an outer surface 126, an inner surface 128, two bolt hole flanges 130, 132 with bolt holes 134, 136 therethrough, and a central aperture 138 between the flanges 130, 132. The surfaces 126, 128 are planar and bounded by an outer perimeter portion 140, wherein unitary foldable tabs 142, 144, 146, 148 and recesses 150, 152, 154, 156 are formed around the outer perimeter portion 140. As depicted in the figures, there are four foldable tabs 142, 144, 146, 148; however, it is within the scope of the invention for there to be more or fewer tabs. The foldable tabs 142, 144, 146, 148 bend approximately 180 degrees, forming a C-shape. The foldable tabs 142, 144, 146, 148 extend outward from the outer perimeter portion 140 and each foldable tab 142, 144, 146, 148 has a fold onto the outer surface 126 of the second inner layer 124. The foldable tabs 142, 144, 146, 148 align with and engage the recesses 80, 82, 84, 86 of the second outer layer 54, as shown in FIG. 4. This interaction, which was described in more detail above, acts as a stopper feature to ensure little or no lateral movement between the layers.

The recesses 150, 152, 154, 156 extend inward from the outer perimeter portion 140 of the second inner layer 124. As depicted in FIG. 9, four recesses 150, 152, 154, 156 are shown; however, it is within the scope of the invention for there to be more or fewer recesses.

The second inner layer 124 also comprises a full bead 158 which circumferentially extends about the central aperture 138 and is inboard of the outer perimeter portion 140, as depicted in FIGS. 2 and 9.

As shown in FIG. 6, the central apertures 34, 68, 102, 138 in all the layers 20, 54, 88, 124 are aligned with one another and have a complimentary shape when the layers 20, 54, 88, 124 are placed together for assembly. Once the layers 20, 54, 88, 124 are placed together, they may be welded to hold them together. When all the layers 20, 54, 88, 124 are aligned, the beads 122, 158 of each of the inner layers 88, 124 are also radially aligned with one another.

It can also be appreciated from FIG. 6 that the tabs and recesses of the various layers are in alignment with one another. For example, the first set of foldable tabs 106, 108, 110, 112 on the first inner layer 88 is aligned with the recesses 46, 48, 40, 52 on the first outer layer 20, and the second set of foldable tabs 114, 116, 118, 120 on the first inner layer 88 is aligned with the locator tabs 38, 40, 42, 44 on the first outer layer 20. The second set of foldable tabs 114, 116, 118, 120 on the first inner layer 88 is also aligned with and in direct contact with the recesses 150, 152, 154, 156 on the second inner layer 124, as depicted in FIGS. 5 and 6. This configuration ensures that the first outer layer 20 and the first inner layer 88 remain in alignment and in direct contact with the second inner layer 124 and the second outer layer 54. The foldable tabs 142, 144, 146, 148 on the second inner layer 124 are aligned with the recesses 80, 82, 84, 86 on the second outer layer 54 and the recesses 150, 152, 154, 156 of the second inner layer 124 are aligned with the locator tabs 72, 74, 76, 78 of the second outer layer 54.

As can also be appreciated from FIG. 6 when the layers are assembled, the inner surface 92 of the first inner layer 88 is directly adjacent the inner surface 24 of the first outer layer 20, and the outer surface 126 of the second inner layer 124 is directly adjacent the inner surface 58 of the second outer layer 54. The outer surface 90 of the first inner layer 88 is directly adjacent the inner surface 128 of the second inner layer 124 when assembled.

The use of the series of tabs and recesses in the various gasket layers that align during layer assembly eliminates the ability of the layers to slide independently if the welds or other means of attachment fail. The tabs act as limiters to the horizontal movement of the layers within the joint. This combination of tabs and recesses does not add additional thickness to the gasket in the region between the joint. The ability to locate these features within the joint eliminates the horizontal motion from "unfolding" the tabs that are acting as the motion limiters.

What is claimed is:

1. An exhaust manifold gasket, comprising: a first outer layer and a second outer layer each comprising a top surface, a bottom surface, two bolt hole flanges with bolt holes therethrough, and a central aperture between said flanges, said surfaces bounded by an outer perimeter, wherein at least two locator tabs extend outward of said outer perimeter and wherein at least two recesses extend inward from said outer perimeter adjacent each locator tab; a first inner layer comprising an top surface, an bottom surface, two bolt hole flanges with bolt holes therethrough, and a central aperture between said flanges, said surfaces bounded by an outer perimeter, wherein a first set of foldable tabs extend from said outer perimeter and have a fold onto said top surface, and a second set of foldable tabs extend from said outer perimeter and have a fold onto said bottom surface, a bead circumferentially extending about said central aperture inboard said outer perimeter; and a second inner layer comprising an top surface, an top surface, two bolt hole flanges with bolt holes therethrough, and a central aperture between said flanges, said surfaces bounded by an outer perimeter, wherein a first set of foldable tabs extend from said outer perimeter and have a fold onto said top surface, wherein a recess extends inward from said outer perimeter adjacent each foldable tab and a bead circumferentially extends about said central aperture inboard said outer perimeter; said first and second inner layers are positioned between said first and second outer layers.

2. An exhaust manifold gasket according to claim 1, wherein said first set of foldable tabs on said first inner layer is aligned with said recesses on said first outer layer.

3. An exhaust manifold gasket according to claim 1, wherein an end surface of a foldable tab of said first set of foldable tabs on said first inner layer contacts a wall defining one of said recesses of said first outer layer.

4. An exhaust manifold gasket according to claim 1, wherein said second set of foldable tabs on said first inner layer is aligned with said locator tabs on said first outer layer.

5. An exhaust manifold gasket according to claim 1, wherein said second set of foldable tabs on said first inner layer is aligned with and in direct contact with said recesses on said second inner layer.

6. An exhaust manifold gasket according to claim 1, wherein said foldable tabs on said second inner layer are aligned with said recesses on said second outer layer.

7. An exhaust manifold gasket according to claim 1, wherein said recesses of said second inner layer are aligned with said locator tabs of said second outer layer.

8. An exhaust manifold gasket according to claim 1, wherein said central apertures of all said layers are aligned with one another and have a complimentary shape to one another.

9. An exhaust manifold gasket according to claim 1, wherein said beads of said inner layers are radially aligned with one another.

10. An exhaust manifold gasket according to claim 1, wherein said bottom and top surfaces of said outer layers are planar and parallel and define between them a substantially constant thickness.

11. An exhaust manifold gasket according to claim 1, wherein four locator tabs extend from said outer perimeter of each of said first and second outer layers and said locator tabs are aligned with one another.

12. An exhaust manifold gasket according to claim 1, wherein said top surface of said first inner layer is directly adjacent said bottom surface of said first outer layer.

13. An exhaust manifold gasket according to claim 1, wherein said bottom surface of said second inner layer is directly adjacent said top surface of said second outer layer.

14. An exhaust manifold gasket according to claim 1, wherein said bottom surface of said first inner layer is directly adjacent said top surface of said second inner layer.

15. An exhaust manifold gasket, comprising: a first layer comprising an top surface, a bottom surface, two bolt hole flanges with bolt holes therethrough, and a central aperture between said flanges, said surfaces bounded by an outer perimeter, wherein at least two locator tabs extend outward of said outer perimeter and wherein at least two recesses extend inward from said outer perimeter adjacent each locator tab; and a second layer comprising a top surface, a bottom surface, two bolt hole flanges with bolt holes therethrough, and a central aperture between said flanges, said surfaces bounded by an outer perimeter, wherein a first set of foldable tabs extend from said outer perimeter and have a fold onto said top surface, and a second set of foldable tabs extend from said outer perimeter and have a fold onto said bottom surface, a bead circumferentially extending about said central aperture inboard said outer perimeter.

16. An exhaust manifold gasket according to claim 15, wherein said first set of foldable tabs on said second layer is aligned with said recesses on said first layer.

17. An exhaust manifold gasket according to claim 15, wherein an end surface of a foldable tab of said first set of foldable tabs of said second layer contacts a wall defining one of said recesses of said first layer.

18. An exhaust manifold gasket according to claim 15, wherein said second set of foldable tabs on said second layer is aligned with said locator tabs on said first layer.

19. An exhaust manifold gasket according to claim 15, wherein said central apertures of said both layers are aligned with one another and have a complimentary shape to one another.

* * * * *